United States Patent [19]

Graebner et al.

[11] Patent Number: 4,803,479

[45] Date of Patent: Feb. 7, 1989

[54] ELECTRICAL PHASE MEASUREMENT MEANS AND METHOD FOR ACCURATE DETERMINATION OF WELL LOGGING CABLE LENGTH

[75] Inventors: Peter Graebner, Santa Ana; Swan A. Sie, Placentia; Jorg A. Angehrn, Brea, all of Calif.

[73] Assignee: Chevron Research Company, San Francisco, Calif.

[21] Appl. No.: 111,245

[22] Filed: Oct. 21, 1987

Related U.S. Application Data

[62] Division of Ser. No. 879,854, Jun. 27, 1986, Pat. No. 4,722,603.

[51] Int. Cl.$^4$ .............................................. G01V 1/40
[52] U.S. Cl. ...................................... 340/860; 367/33
[58] Field of Search ........................ 367/33, 149, 48; 340/856, 860, 861, 857; 356/5, 4.5; 324/206

[56] References Cited

U.S. PATENT DOCUMENTS

| 4,328,567 | 5/1982 | Dodge | 367/32 |
| 4,450,540 | 5/1984 | Mallett | 367/32 |
| 4,555,175 | 11/1985 | Gardner et al. | 356/73.1 |
| 4,597,183 | 7/1986 | Broding | 324/356 |
| 4,612,536 | 9/1986 | Harman | 333/237 |

Primary Examiner—Thomas H. Tarcza
Assistant Examiner—Ian J. Lobo
Attorney, Agent, or Firm—S. R. La Paglia; E. J. Keeling; V. A. Norviel

[57] ABSTRACT

A method and apparatus for determining the vertical location of a logging tool in a wellbore is disclosed. An electrical signal is transmitted through a conductor in a well logging cable and a second conductor in the surface. Change in length of the well logging cable is determined by monitoring phase changes in the signals from the first and second conductors.

4 Claims, 2 Drawing Sheets

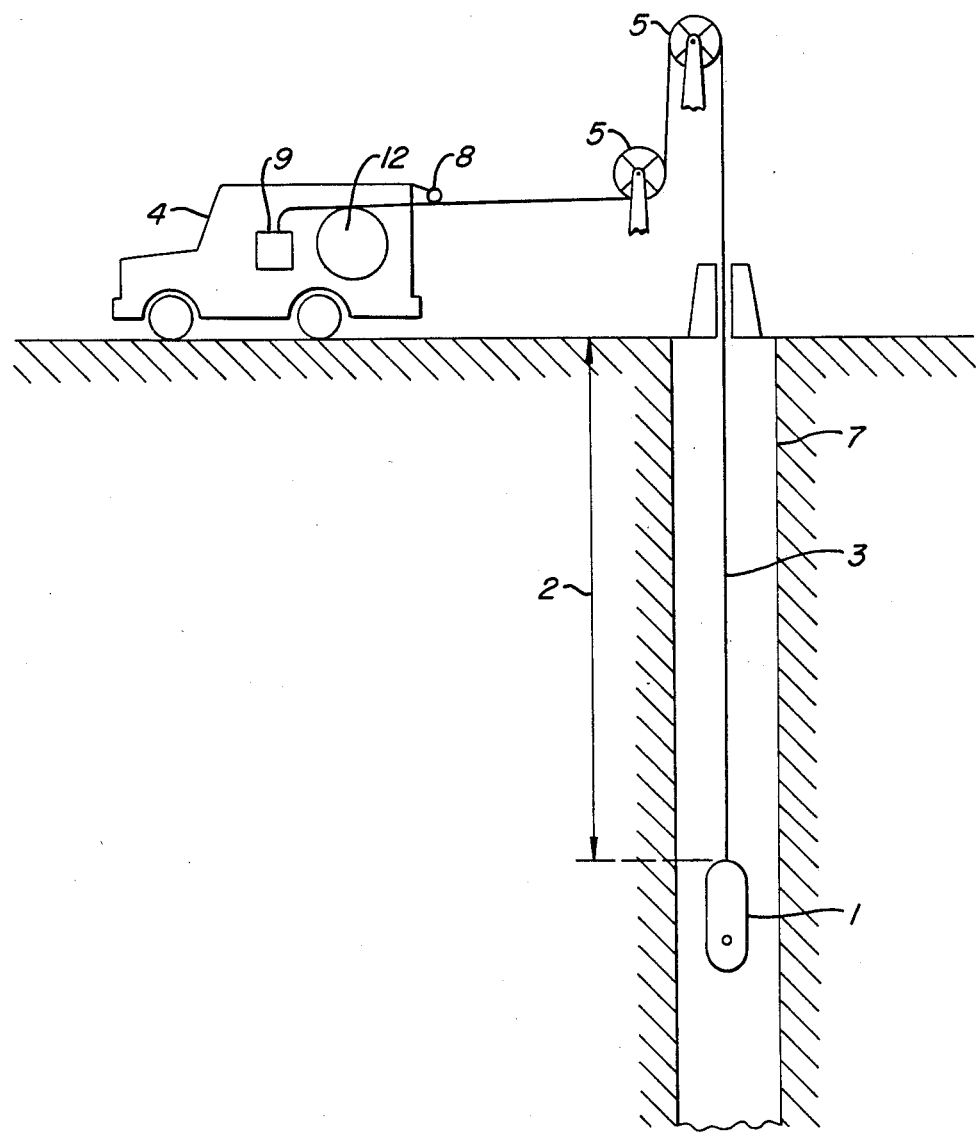
FIG._1.

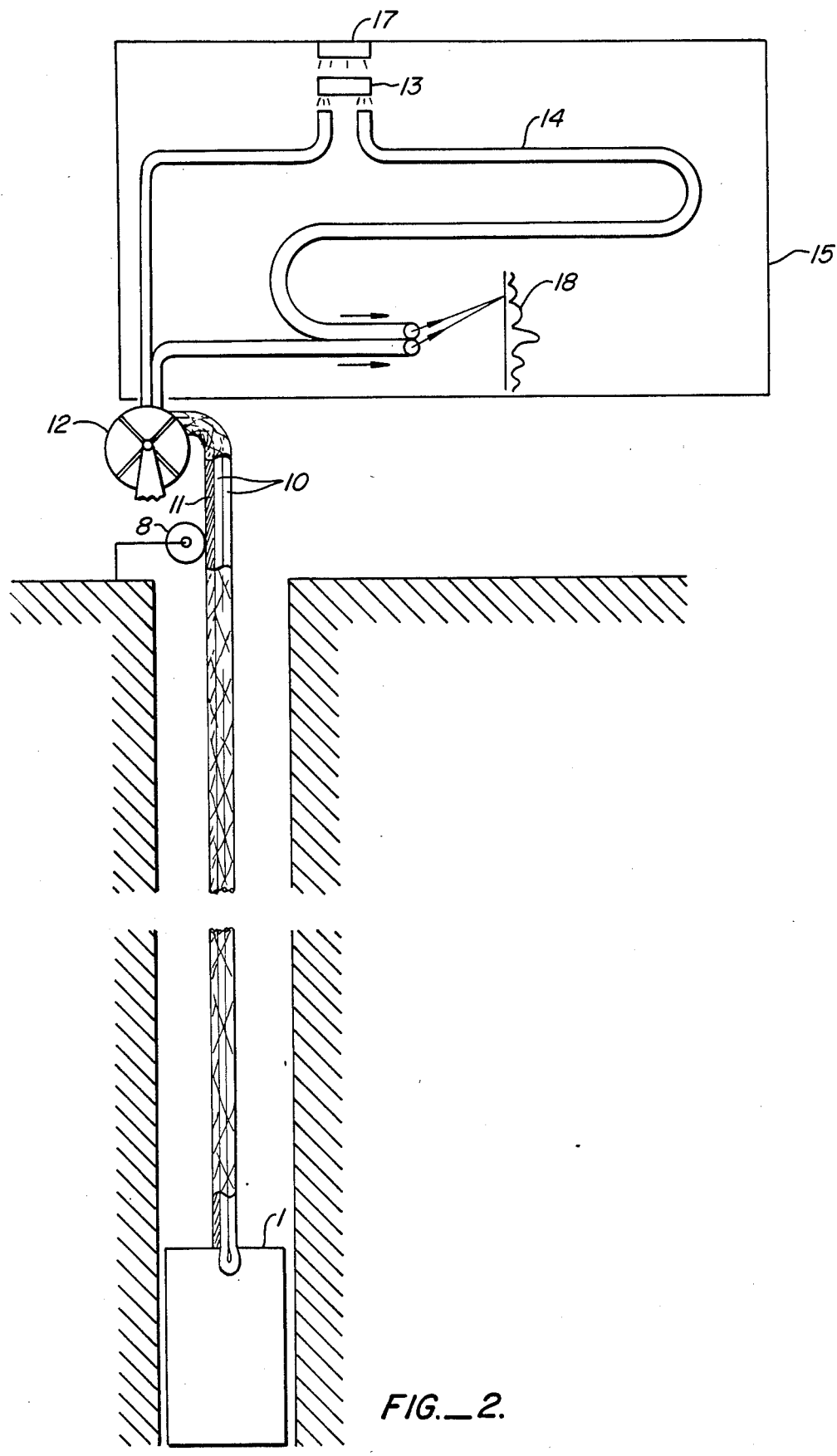
FIG.__2.

000
ELECTRICAL PHASE MEASUREMENT MEANS AND METHOD FOR ACCURATE DETERMINATION OF WELL LOGGING CABLE LENGTH

This is a division of application Ser. No. 879,854, filed June 27, 1986, now U.S. Pat. No. 4,722,603.

FIELD OF THE INVENTION

This invention relates to a means and method for accurately determining the length of a fiber optic cable. More specifically, the invention relates to a method and means for accurately determining the length of a fiber optic cable in order that the depth of a borehole gravity meter can be determined.

BACKGROUND OF THE INVENTION

In the exploration for and production of oil and gas reservoirs, various types of logging tools are lowered into the well for the purpose of determining the physical characteristics of rock surrounding the well. Often, it is important to know with a great deal of accuracy the depth of the logging tool. It may also be important to accurately know the distance between locations which have been occupied by the tool.

One such tool is a borehole gravity meter. A borehole gravity meter is used to estimate the interval bulk density of rock surrounding the well. When the borehole gravity meter is raised or lowered in the well, the change in the relative value of the vertical component of the intensity of the gravitational field can be accurately determined. If the distance between the vertical locations is also accurately known, the interval bulk density can be accurately determined.

The present technology for determining tool location utilizes a mechanical length measurement device at the surface. Odometers, radioactive tape, inking, painting, and mechanical wheels have been described as being useful in determining the length of wire which has entered the hole (e.g., see "Cable Marker/Detector is a Magnetic-Type System", *Oil and Gas Journal*, Feb. 21, 1982, page 148). These devices do not account for downhole cable stretch due to friction, tool and cable weight, or thermal expansion or shrinkage. These variations in cable length can introduce an error of several feet in absolute tool location or several inches in the relative distance between two locations in a borehole.

The use of laser light in determining the pressure and temperature conditions within a wellbore has been described (U.S. Pat. No. 4,375,164 incorporated herein by reference) wherein the index of refraction of two optical fibers are compared by examining the interference pattern of laser light in a photomultiplier.

In none of the above technology is an accurate means of determining the vertical location of a tool or logging sonde within a wellbore described in which the interference pattern of a laser light is utilized.

Consequently, it is an object of this invention to provide a method and means for accurately determining location of a tool in a borehole or casing. It is another object of the invention to provide a method and means for accurately determining the change in location of a tool in a borehole or casing. It is a further object of the invention to provide a method and means of accurately determining the interval bulk density of rocks which occupy the space between two locations. It is a further object to accurately measure the depth at which data samples are taken such as resistivity, sonic travel time, etc.

SUMMARY OF THE INVENTION

A method and apparatus is described for determining the location or change in location of a tool in a borehole or casing. A monochromatic laser light beam is divided into two optical paths into each of two fibers. One fiber is of fixed and nominal length, and the second is several thousand feet long and is integrated into a cable. The cable/fiber is lowered into a wellbore or casing with a logging tool suspended from the cable. When the light from the two fibers is recombined, an interference pattern of light and dark bands (interference fringes) is generated. Any change in length of the second optical fiber will cause the fringes to shift. The number of fringes which pass a fixed reference point is a direct measure of the length change in the second optical fiber.

If the cable length (and, thus, the second optical fiber) remains the same, there will be no shift in the interference pattern. If the cable contracts, the fringe pattern shifts in one direction, while it shifts in the other direction if the cable stretches. The number of fringes passing a fixed location can be determined.

The absolute location of the tool can be determined by combining the information from an odometer or encoder of the type well known in the art with that of the interferometer. The odometer provides the depth for a non-stretching cable and the interferometer provides information concerning actual stretch or shrinkage. The combined information establishes the absolute depth. Likewise, the distance traveled between two locations can accurately be determined.

BRIEF DESCRIPTION OF THE DRAWINGS

FIG. 1 schematically shows the overall placement of the optical equipment with respect to the wellbore.

FIG. 2 schematically shows the optical cables, laser, wellbore, and the manner in which fringe pattern shift is detected.

DETAILED DESCRIPTION OF THE INVENTION

Referring to FIG. 1, the invention is intended to measure the vertical location (depicted by arrow 2) or change in location of a logging tool 1. The logging tool 1 is held in place by a cable 3 attached to a wire line vehicle 4 at the surface. An optical fiber is built into the cable and looped back to the surface through the cable. The cable/fiber may be routed over one or more pulleys 5 and are stored on a reel 12.

As the well logging tool 1 is lowered into the well 7, the cable will stretch due to both tension and thermodynamic factors. An odometer or optical encoder 8 is used to measure the length of the cable 3 as if it were unstretched. Logging measurements are generally performed while the logging tool is being raised. Friction on both the tool and the cable, as well as the weight of the cable and tool itself, tends to change the length of the cable. The interferometer/laser combination 9 is used to measure the change in length of the optical fibers which have been lowered into the well with the cable 3. Since the cable and optical fiber are both rigidly connected to the well logging tool, the change in length of the optical fiber will be exactly the same as the change in length of the cable. The precise vertical location of the logging tool can, therefore, be determined.

Referring now to FIG. 2, the long optical fiber 10 and the cable 11 are depicted separately for clarity. The optical fiber would be contained within the cable and enter the interferometer housing mounted inside the cable reel 12. As the cable 11 and well logging tool 1 are lowered into the well 7, the amount of cable is recorded with an odometer or other cable measuring device 8. The cable containing the long optical fiber is stored on a cable reel 12. It should be noted that additional optical fibers may be lowered into the wellbore along with the long fiber discussed herein and be used for other purposes or the long optical fiber may actually consist of two fibers (one which carries the beam downwards and one which returns the beam to the surface).

A source of monochromatic light 17, preferably a laser, is used to generate a beam of light which is divided by a beam splitter 13 of the type well known in the art into the long optical fiber 10 and a second optical fiber of nominal length 14. The logging tool 1 is raised or lowered into the well by revolving the cable reel.

After passing through the optical fibers of different lengths, the light beams are combined and an interference pattern 16 of light and dark bands is produced. The interference bands 18 are monitored with the interferometer 15. Any change in the length of the long optical fiber will cause the fringes to shift. The number of fringes which pass a fixed reference point is a direct measure of the length change in the long fiber. It should be noted that commercially available devices well known to one skilled in the art are available to generate the light beams, combine the beams and monitor the interference pattern.

The absolute location of the logging tool can be determined by combining the information from the odometer 8 and the interferometer 15. The odometer provides the depth for an unstretched cable or a cable with uniform stretch and the interferometer provides information concerning the actual stretch or shrinkage because for each fringe passing a fixed point, the cable length has changed in an amount equal to ½ the wavelength of the light being used. The combined information determines absolute depth. Similarly, by establishing the absolute depth at each of two locations, the distances traveled between two locations can be determined.

The utility of the invention can be recognized in its application to the determination of the interval bulk density in borehole gravity measurements. The interval bulk density can be estimated using the equation:

$$\rho_b = \frac{1}{4\pi k}\left(F - \frac{\Delta g}{\Delta z}\right)$$

where:
$\rho b$=Interval bulk density.
k=Universal gravitational constant.
F=Free air gradient.
$\Delta g$=Change in gravitational force between a first location and a second location.
$\Delta z$=Change in vertical location between the first location and the second location.

$\Delta g$ can be determined with precision with a borehole gravimeter familiar to one skilled in the art. In fact, $\Delta g$ can be determined with far greater precision than $\Delta z$ using previously known methods. The vertical location at each of two locations can be determined with precision equal to that of $\Delta g$ using the above-described interferometric method/means and, therefore, $\Delta z$. The value of F can be precisely determined by means well known in the art with a knowledge of the latitude, elevation, and rough knowledge of the vertical location of the tool (for example, from the average vertical location between the two locations). "k" is a well-known constant. Therefore, the value of $\rho_b$ can be accurately and precisely determined with the above-described method of determining $\Delta z$.

The principle described above for optically determining the cable length could similarly be performed electrically. In an electrical application, a single frequency electrical signal would be generated by means well known to one skilled in the art with a signal generator.

Well logging cables generally contain a plurality of insulated wires that are used to perform various functions. In this case, the electrical signal (a single frequency sine wave) would be sent down one of these insulated wires and returned through another. An identical signal would be transmitted through a shorter wire wholly contained on the surface. The transit time (and, therefore, distance) is then measured by comparing the phases of the signals. The change in length of the cable is determined by measuring the phase shift.

The frequency of the sine wave is estimated to range between 100 Khz and 10 Mhz. The higher frequency will provide more accurate results but requires the use of a stable filter that will very narrowly filter the signal. It is estimated that by using a 10 Mhz signal that the depth of the logging sonde could be determined within ±0.55 cm.

Further uses and embodiments of the above-described invention will be readily apparent to one skilled in the art. The scope of the invention is not intended to be limited by the above description, but instead by the claims hereinafter listed.

What is claimed is:

1. Apparatus for determining the change in length of a well logging cable holding a tool comprising:
   a sinusoidal electrical signal generating means;
   a first conductive means of a fixed length;
   a second conductive means, said second conductive means extending downwardly into a wellbore and rigidly connected to the cable;
   a third conductive means, said third conductive means extending upwardly from the tool in the wellbore to the surface and operably connected to said second conductive means; and
   a means for comparing the phase shift of a signal between said first conductive means and said third conductive means.
   means for calculating the change in length of the well logging cable based on said phase shift.

2. Apparatus as recited in claim 1 further comprising a filter means operably connected to said means for comparing the phase shift of a signal.

3. Apparatus as recited in claim 2 wherein said signal generating means can generate a signal in the range of 100 Mhz and 10 Mhz.

4. A method of determining a change in length of a well logging cable holding a tool comprising the steps of
   (a) generating a sinusoidal electrical signal;
   (b) conducting said sinusoidal electrical signal through a first conductive means of a fixed length to produce a second signal;

(c) conducting said sinusoidal electrical signal through a second conductive means, said second conductive means extending downwardly into a wellbore and rigidly connected to the cable;

(d) returning said signal to the surface of the wellbore from said second conductive means to produce a third signal;

(e) comparing a phase shift of the second signal and the third signal;

(f) calculating a change in length of the well logging cable based on said phase shift.

* * * * *